United States Patent
Hess et al.

(10) Patent No.: US 8,380,910 B2
(45) Date of Patent: Feb. 19, 2013

(54) OUT OF BAND LOCATION INFORMATION RETRIEVAL

(75) Inventors: Thomas Hess, Bad Liebenzell (DE); Philip Sebastian Schulz, Boblingen (DE); Markus K Strasser, Metzingen (DE); Sven Wagner, Tiefenbronn (DE); Constantin Werner, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 13/085,755

(22) Filed: Apr. 13, 2011

(65) Prior Publication Data

US 2012/0265912 A1    Oct. 18, 2012

(51) Int. Cl.
*G06F 13/00*    (2006.01)
(52) U.S. Cl. ........................................ 710/301; 709/222
(58) Field of Classification Search .......... 709/220–222; 710/105, 300–304, 104
See application file for complete search history.

(56) References Cited

U.S. PATENT DOCUMENTS

| 7,461,192 B2 | 12/2008 | Sobelman |
| 7,620,741 B2 | 11/2009 | Torudbakken et al. |
| 7,734,741 B2 | 6/2010 | Ayyar et al. |
| 7,766,692 B2 | 8/2010 | Johnsen et al. |
| 2010/0281195 A1 | 11/2010 | Daniel et al. |

FOREIGN PATENT DOCUMENTS

EP    2034410 A2    3/2009

*Primary Examiner* — Clifford Knoll
(74) *Attorney, Agent, or Firm* — David Mims; Robert C. Rolnik (57) ABSTRACT

A data processing system boots at least one service processor controlling at least one PCIe card in an I/O unit. The data processing system boots a second service processor located in a processor unit, wherein the processor unit and I/O unit are interconnected using functional path conductors, wherein functional path conductors are according to PCIe standard. The data processing system reads location information from the first at least one service processor, wherein the location information is reported for each PCIe card prior to initializing a functional path to the PCIe card. The data processing system sends location information from the second at least one service processor to a system controller. The data processing system initializes the PCIe card and a hub card of the processor unit in order to initialize a functional path and configures the I/O unit by communicating configuration commands over the functional path.

20 Claims, 4 Drawing Sheets

OUT OF BAND LOCATION INFORMATION RETRIEVAL

BACKGROUND OF THE INVENTION

1. Field of the Invention

The present invention relates generally to a computer implemented method, data processing system, and computer program product for configuring peripheral circuits of modular data processing systems. More specifically, the present invention relates to detecting topologies of modular systems that use standard cabling.

2. Description of the Related Art

Technicians, who build and maintain data centers, are responsible to build racks or frames in which to hold the electrical components. A frame is a vertical structure that typically rests on the floor of the data center and is arranged to permit shelves, drawers or cages to be bolted or otherwise fastened to the frame. The frame can provide pathways for data and power cables to attach between the modular components of the data system.

In many cases, a data center may distribute computing tasks among multiple processors or among multiple storage devices or block devices. Accordingly, a physical location of a device maps to a logical organization of devices in a hierarchy. Assembly of the data center can occur remotely from the architects of the data center. To counteract difficulties in establishing inventory and location of peripheral cards, in response to adding frames and cages, technicians add labels, signs, or references to landmarks to locate where the devices, such as I/O cages can be found. In addition, equipment can be added over a lengthy period. Minor errors in placement of peripheral cards can occur, which can make locating a specific peripheral card difficult later.

As a data center is assembled, or in response to errors in an I/O device, the data center may report that an I/O device is out of service, or otherwise requires hands-on maintenance. Accordingly, a method to report locations by frame, cage and/or slot can be beneficial. In addition, a system can be reconfigured with additional equipment during power-off phases. Locating the equipment in response to phased power-up of the data center can be useful.

SUMMARY OF THE INVENTION

The present invention provides a computer implemented method, computer program product and data processing system for retrieving location information. A data processing system boots a first at least one service processor controlling at least one PCIe card in an I/O unit. The data processing system boots a second at least one service processor located in a processor unit, wherein the processor unit and I/O unit are interconnected using functional path conductors, wherein functional path conductors are according to Peripheral Component Interconnect Express (PCIe) standard. The data processing system reads location information from the first at least one service processor, wherein the location information is reported for each PCIe card in the I/O unit prior to initializing a functional path to the PCIe card. The data processing system, responsive to reading location information, sends location information from the second at least one service processor to a system controller. The data processing system, responsive to collecting location information, initializes the PCIe card and a hub card of the processor unit in order to initialize a functional path. The data processing system configures the I/O unit by communicating configuration commands over the functional path connected to the PCIe card.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
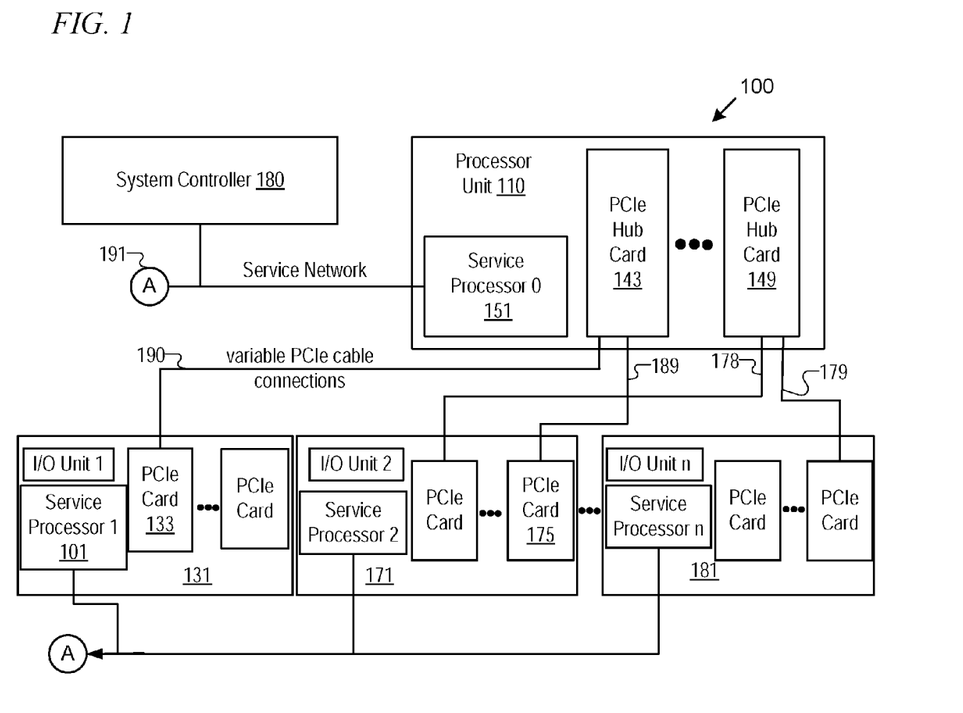
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a processor unit 110 that is locally controlled by service processor 0 151. Service processor 0 151 receives commands from and interacts with system controller 180. A service processor is a processor that is part of the system control structure to configure, enable, and/or diagnose one or more subsystems of a data processing system. Processor unit 110 may include several Peripheral Component Interconnect Express (PCIe) hub cards, for example, PCIe® hub card 143 and PCIe® hub card 149. PCIe and PCI Express are registered trademarks of PCI-SIG. A hub card, such as a PCIe hub card, is a central aggregator of data accessing functions to one or more PCIe cards. The hub card acts as an interface for the processor unit to access all connected PCIe units. If there is one connected PCIe unit, the processor accesses only that one PCIe unit. However, a more typical arrangement may be to have several PCIe chips, one for each PCIe card, that permit each among such PCIe cards (and the I/O units) to be accessed by the PCIe hub card. For example, a PCIe card relies on mechanical and electrical standardized connectors for PCIe to access and/or control I/O units. Descriptions of PCIe cables, PCIe cards, and the like are according to the "PCI Express Specification 1.1," "PCI Express Base 2.0 Specification," and "PCI Express Base Specification 3.0" published by PCI-SIG and updated from time to time, hereinafter "PCIe Standards". For example, a PCIe card is a daughterboard that connects to a PCIe connection and communicates to additional PCIe cards at least according to the communication protocols set out in the PCIe Standards. Accordingly, the PCIe card is an endpoint of the functional path, defined further below.

An I/O unit is a mechanical frame that houses a variety of I/O function options, such as Ethernet or disk adapter cards. Similar to the processor unit 110, I/O unit 1 131 is locally controlled by a service processor 1 101. The service processor of the I/O unit receives commands from and interacts with system controller 180 via the service network 191.

I/O units include, for example, IO Unit 1 131, I/O unit 2 171, and I/O unit n 181, where 'n' is the final in a series of n I/O units, and 'n' is an integer. I/O units themselves include a service processor, for example, service processor 1 101 of I/O unit 131. Each service processor of the I/O units, as well as the service processor 0 151, are controlled from system controller 180. In addition, each I/O unit may include PCI cards, such as PCI Card 133.

One of the differences between the architecture of FIG. 1 and that of conventional personal computers is, unlike the personal computer which relies on sending PCIe signals on a backplane or motherboard, the data processing system 100 can rely on flexible PCIe cabling that permits easy scaling of the number of cages, as well as flexibility in placement of the cages, which house the I/O cards. As a consequence, the location of the cages and corresponding PCIe cards can be difficult to determine without direct observation of the routing of the PCIe cabling. FIG. 1 depicts an architecture that provides ellipsis to represent additional PCIe cards, PCIe hub cards and I/O units. The ellipsis in the figure indicates possible additional PCIe cards. For example, if all PCIe cards shown were attached to a PCIe Hub card, six cables for data pathways are present, including cable 190. With the flexibility and scalability comes a corresponding problem of determining which among the many PCIe cards may need service, among other issues. Embodiments of the present invention permit the system controller to identify locations of cards and the connections of flexible cables between the PCIe hub cards and the PCIe cards even before the functional path is available.

Functional path conductors are those conductors that provide parallel paths for at least one PCIe lane. A functional data connection, also referred to as a functional path, may use the functional path conductors. The functional path conductors can be joined by modular connectors so that a cable (e.g. a PCIe cable) a backplane, additional cables, as well as any traces on daughterboard cards can be parts of the functional data connection or functional path conductors. In the example data processing system 100, PCIe hub card 143 can provide a connector so that the functional path may extend over cable 190 and cable 189 to PCIe card 133 and PCIe card 175. Functional path conductors are described in more detail in FIG. 2. A second functional data connection is formed from cables 178 and 179.

Figure 2:
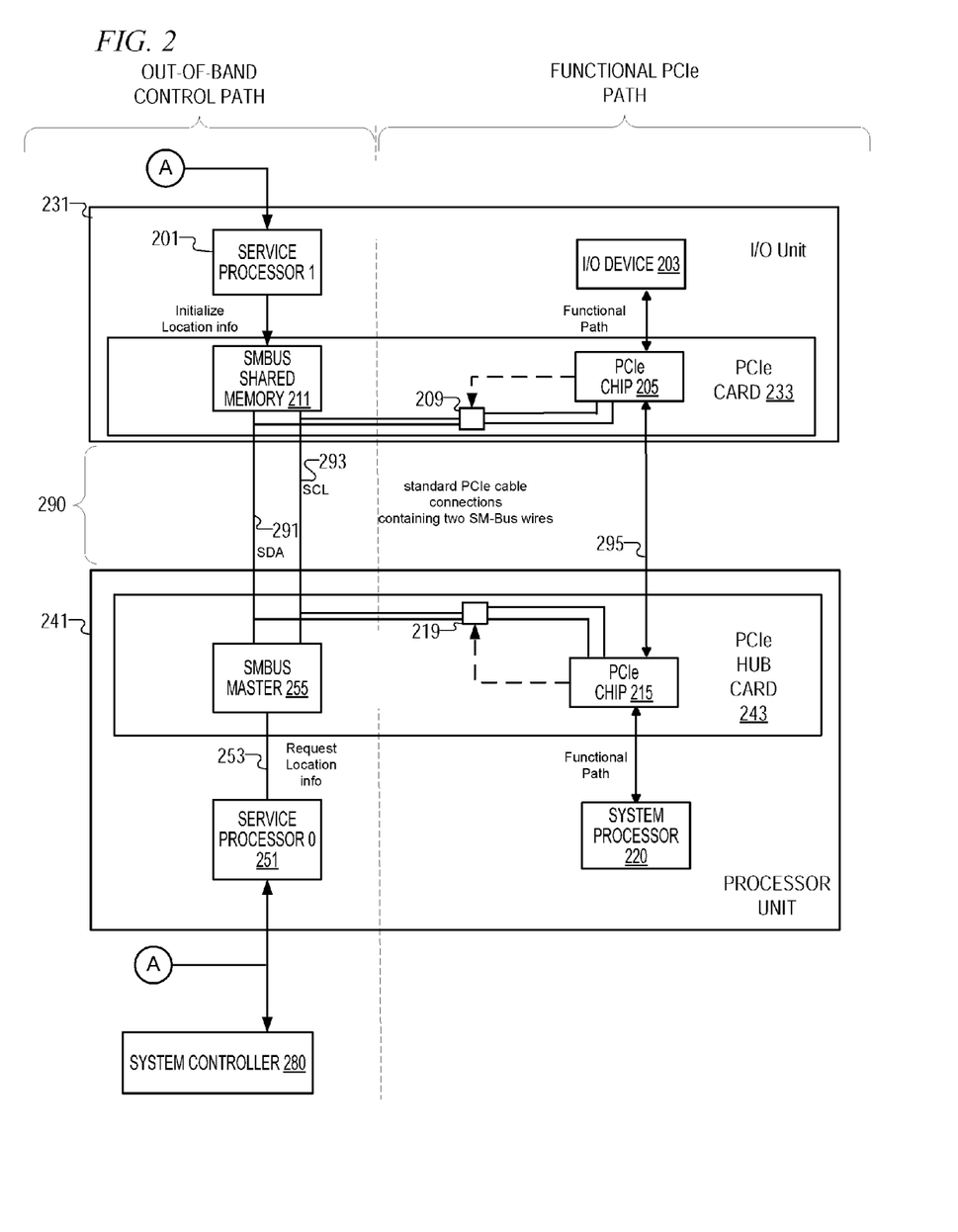
FIG. 2 is a detailed block diagram of the data processing system in accordance with an illustrative embodiment of the invention.

FIG. 2 is a detailed block diagram of the data processing system in accordance with an illustrative embodiment of the invention. Parts of FIG. 1 are shown in more detail in FIG. 2. System controller 280 communicates to service processor 0 251 and service processor 1 201. The system controller 280 may be, for example, system controller 180 of FIG. 1.

The processes of the illustrative embodiments can be performed by system controller 280, and/or service processors 251, 201. The system controller and/or service processors may execute computer implemented instructions, which may be located in a memory such as, for example, main memory, read only memory, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIGS. 1 and 2.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to the system controller or service processors, or other programmable data processing apparatus to produce a machine, such that the instructions, which execute via the processor of the system controller, service processors or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions which execute on the computer or other programmable apparatus provide processes for implementing the functions/acts specified in the flowchart and/or block diagram block or blocks.

Returning to FIG. 2, the circuits of both the I/O unit 231 and the processor unit 241 can be divided into two logical portions. These portions comprise, first, the portion that is operable before the functional path is initialized, and second, the portion that is operable after the functional path is initialized. The dashed line shows the logical division of the out-of-band control path which can be used while the functional path is not yet initialized on the left and the functional PCIe path which can be used after initialization of the PCIe chip 205 and 215 on the right. The functional path, which in this example is a functional PCIe path, exists when suitable PCIe chips are initialized. In other words, functional path conductors are present as a physical conduit through which functional path signals may travel. However, until the functional path conductors are configured and initialized correctly, the functional path conductors may not be sufficient to carry the functional path signals. This step of initialization is described further, with reference to FIG. 3, steps 313 and 315, below. PCIe cable 290 may be a cable that includes conductors for out-of-band conductors (Serial Data Line (SDA) 291 and Serial Clock (SCL) 293) and functional path conductors 295. A PCIe connection is a peer-to-peer structure that adheres to mechanical and electrical characteristics specified in PCI Special Interest Group specifications. The PCIe cable at least follows the mechanical properties specified for PCIe busses. Accordingly, when the functional path is initialized to use the functional path conductors, PCIe hub card 243 may communicate with PCIe card 233 via their respective PCIe chips.

The PCIe connection is made of the out-of-band conductors and functional path conductors. Out-of-band conductors are two signal lines identified as SDA 291 and SCL 293. The out-of-band conductors can rely on a two-wire interface. A two-wire interface is a communication interface that transmits information across two conductors having a first end of the two-wire interface and a second end of the two-wire interface. The ends are connected to SMbus shared memory and a SMBus master, respectively. Functional path conductors 295, may comprise at least one PCIe lane. In the example, each lane is composed of four wires providing a send and a receive path. As many as 32 lanes may be present in a PCIe cable, plus the out-of-band conductors.

A SMBus master is a processor or logic circuits configured to operate some or all of the steps in FIG. 5, below. Initializing the data processing system can occur by sending or receiving data across SMBus lines. SMBus lines or out-of-band conductors are lines arranged to permit serial communication via two conductors. The functional path must not be initialized for signaling to be made over SDA 291 and SCL 293 lines. Instead, initial communication and configuration operations are performed and coordinated using the processing unit 241 as an intermediary between the I/O units (such as I/O unit 231) and system controller 280.

The out-of-band conductors, SDA 291 and SCL 293, can operate according to inter-integrated circuit specifications as described in "The I2C-Bus Specification Version 2.1" January 2000, by Philips Semiconductors, incorporated herein by reference. Use and operation of the SDA and SCL conductors may be according to System Management Bus or SMBus specifications, as further defined in "System Management Bus (SMBus) Specification Version 2.0", 2000 by The System Management Interface Forum, Inc, hereinafter 'SMBus Specification'. Further explanation of the signals and/or packets carried by these out-of-band conductors is made in relation to FIG. 4, below.

SMbus shared memory 211 or shared memory is a piece of memory that can be accessed from either the service processor (e.g. service processor 1 201) or from SMBus master 255. The service processor may access shared memory using, for example, Universal Asynchronous Receiver-Transmitter (UART), Serial Peripheral Interface (SPI), or any memory interface. The shared memory can be a standard I2C memory, any other microcontroller or a piece of main memory in service processor 201. Shared memory can be either volatile memory or non-volatile memory. Further, the shared memory may be virtual shared memory. In which case, the SMBus slave part of PCIe card 233 can reside on this card itself and is connected via a memory interface to service processor 201. Otherwise, the service processor provides a SMBus interface for each PCIe card.

Functional path conductors are those conductors that provide parallel paths for at least one PCIe lane. The conductors can be joined by modular connectors so that a cable (e.g. PCIe cable), a backplane, additional cables, as well as any traces on daughterboard cards can be parts of the functional data connection or functional path conductors. Each PCIe chip, for example PCIe chip 205 provides supporting functionality for the I/O device, such as I/O device 203, on one hand, as well as the system processor, such as system processor 220, on the other hand.

Figure 3:
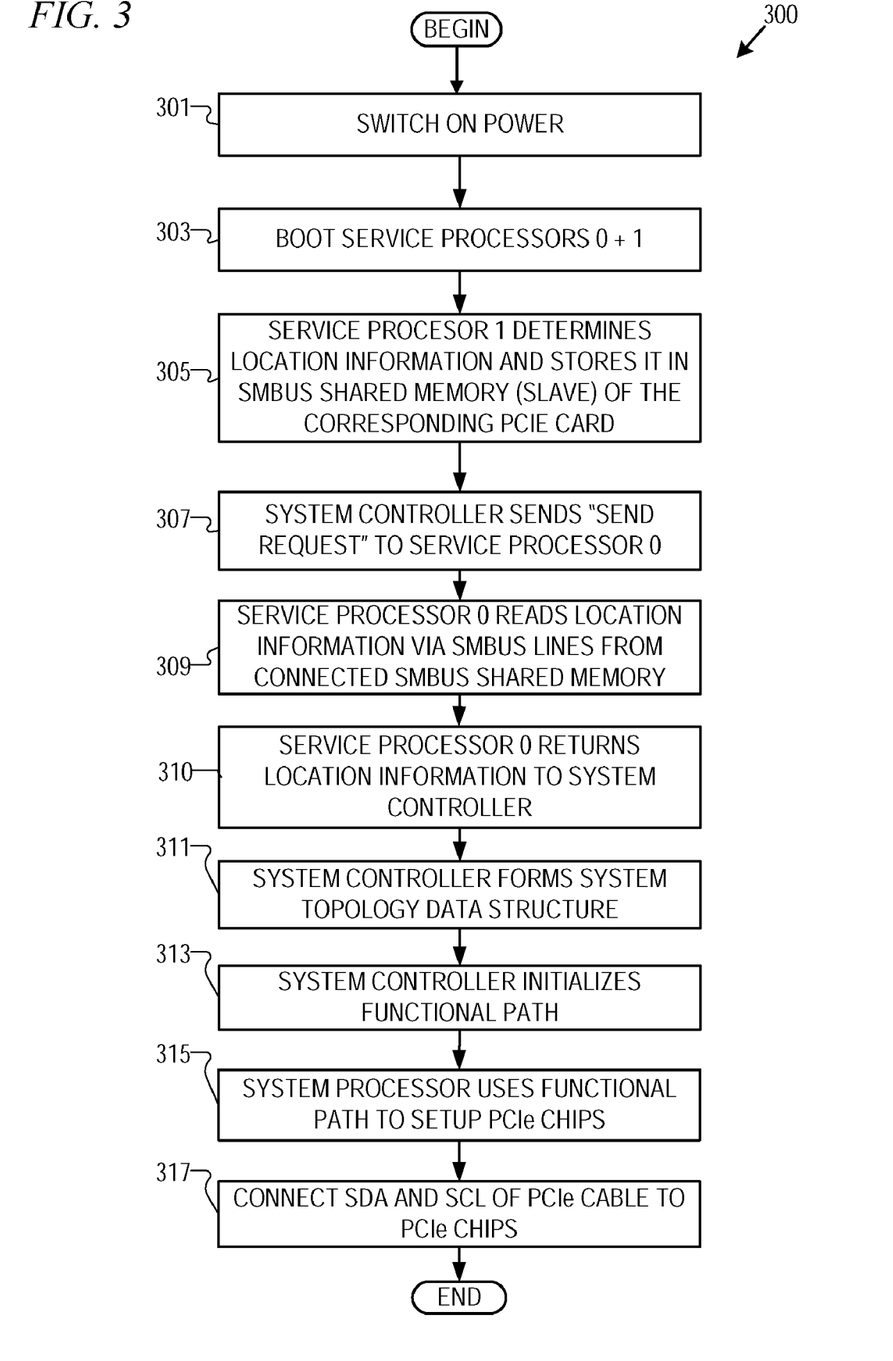
FIG. 3 is a flowchart of coordinated operations for changing functional path state in one or more PCIe cards accordance with an illustrative embodiment of the invention.

FIG. 3 is a flowchart of coordinated operations for changing the functional state in one or more I/O devices in accordance with an illustrative embodiment of the invention. In addition, flowchart 300 shows how the system controller is able to establish the topology of the architecture before the functional path is initialized.

Initially, the power is switched on (step 301). This step can be performed, for example, by an operator of the data processing system. Accordingly, the functional path using functional path conductors 295 may not be able to carry signals from the uninitialized PCIe chips. In addition, the SDA 291 and SCL 293 lines in each PCIe cable are isolated from the PCIe chips by switches 209 and 219 until functional path is initialized. As may be appreciated, the number of I/O units and service processors, etc. may vary according to the complexity and growth of the data processing system.

Next, as a result of receiving power, all service processors are booted (step 303). In the case of the topology of FIG. 2, service processor 0 and service processor 1 are booted.

In response to booting, service processor 1 201 (as well as all other service processors for I/O units) determines location information of each PCIe card (in each I/O unit), and stores the location information in the SMBus shared memory for each corresponding PCIe card (step 305). Location information identifies at least a cage and a slot in sufficient detail to distinguish one peripheral card from all other peripheral cards managed by the system controller. Next, the system controller sends a "send request" to service processor 0 251, or the service processor that is associated with the processor unit (step 307). A "send request" is a request from the system controller to the service processor in the processor unit to retrieve the location information from the PCIe cards in the I/O unit using the service processor of the I/O unit. It is appreciated that in further illustrative embodiments, such as those that use a real Serial Electrically Erasable Programmable Read-Only Memory (SEEPROM) or microcontroller, the service processor of the I/O unit may not be involved when the service processor of the hub card is reading. In other words, the SEEPROM may be used, in an alternative embodiment, in place of SMBus shared memory 211.

Next, the service processor of the processor unit reads location information via the SMBus lines from connected SMBus shared memory (step 309). In the illustrative embodiment of FIG. 3, the out-of-band conductors are implemented as SMBus lines. The process for reading the SMBus lines is further explained with reference to FIGS. 4 and 5, below.

The service processor of the processing unit can be, for example, service processor 0 251 of FIG. 2. After the service processor has either obtained location information from slave devices, or at least failure of the slave device(s) to respond, the service processor may send such location information to the system controller (step 310). Slave devices are the one or more I/O units that report using their respective SMBus shared memories.

In response to receiving the location information, the system controller may use the location information to form a system topology data structure (step 311). Next, the system controller initializes the functional path (step 313). The system controller controls the service processors. Next, the system processor uses the functional path to setup the PCIe chips (step 315). A PCIe chip can be, for example, PCIe chip 205 and PCIe chip 215 of FIG. 2.

Next, the PCIe chips, once initialized, may close switches to connect SDA 291 and SCL 293 lines to the PCIe chips (step 317). The data processing system is then ready to use.

Figure 4:
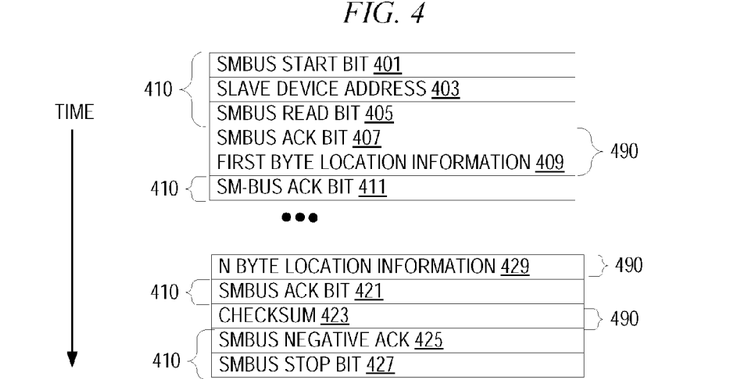
FIG. 4 is a sequence of exchanged signals between a PCIe hub card and a PCIe card permitted in accordance with an illustrative embodiment of the invention.

FIG. 4 is a sequence of exchanged signals between a PCIe hub card and a PCIe card in accordance with an illustrative embodiment of the invention. By use of the protocol, shown here, the data processing system may send the data block(s) containing location information from PCIe cards to the PCIe hub card that controls each set of PCIe cards. The signals may rely on the SMBus to transport location information in a series of bytes from the PCIe card to the PCIe hub card. The signals are arranged in time order of a successful read of location information such that earlier bits and bytes appear at the top and later bits and bytes appear at the bottom. At various points in time, the PCIe hub card transmits signals 410. As such, the PCIe hub card may behave in the role of master in the I2C protocol. In contrast, the PCIe card may respond with PCIe card signals identified by PCIe card signals 490. As such, the PCIe card may behave in the role of slave in the I2C protocol. It is appreciated the I2C is one of several possible protocols that can use the SMBus to send location information.

Initially, the PCIe hub card sends the SMBus start bit 401, slave device address 403 and SMBus read bit 405. The PCIe card, that has the matching slave device address, responds with SMBus ack bit 407 and a first byte of location information 409. SMBus ack bit or SMBus acknowledge bit, as well as the SMBus start bit are described further in the SMBus Specification. The SMBus slave device address uniquely identifies the shared memory of the PCIe card In response to the SMBus ack bit and the first byte of location information, the PCIe hub card can reply with SMBus ack bit 411. The PCIe card may iterate by sending a byte of location information with corresponding SMBus ack bits from the PCIe hub card, as indicated by the PCIe card transmitting N byte location information 429. Similarly, in response, the PCIe hub card transmits a SMBus ack bit 421 until N bytes are received, where N is the sum total of all location information available from the PCIe card.

After the PCIe card sends the final location information and correspondingly receives the SMBus ack bit 421 for the final location byte, the PCIe card sends checksum 423 to the PCIe hub card. Checksum 423 can be a cyclical redundancy checksum or any other checksum that can identify one or more errors received by the PCIe hub card, if such errors are present.

In response to a checksum that confirms correct receipt of all 'N' bytes, the PCIe hub card may send SMBus negative ack 425 or NACK, as well as SMBus stop bit 427 to the PCIe card. A negative acknowledgement, or 'negative ack', as well as 'stop bit' are defined further in the SMBus standard.

Figure 5:
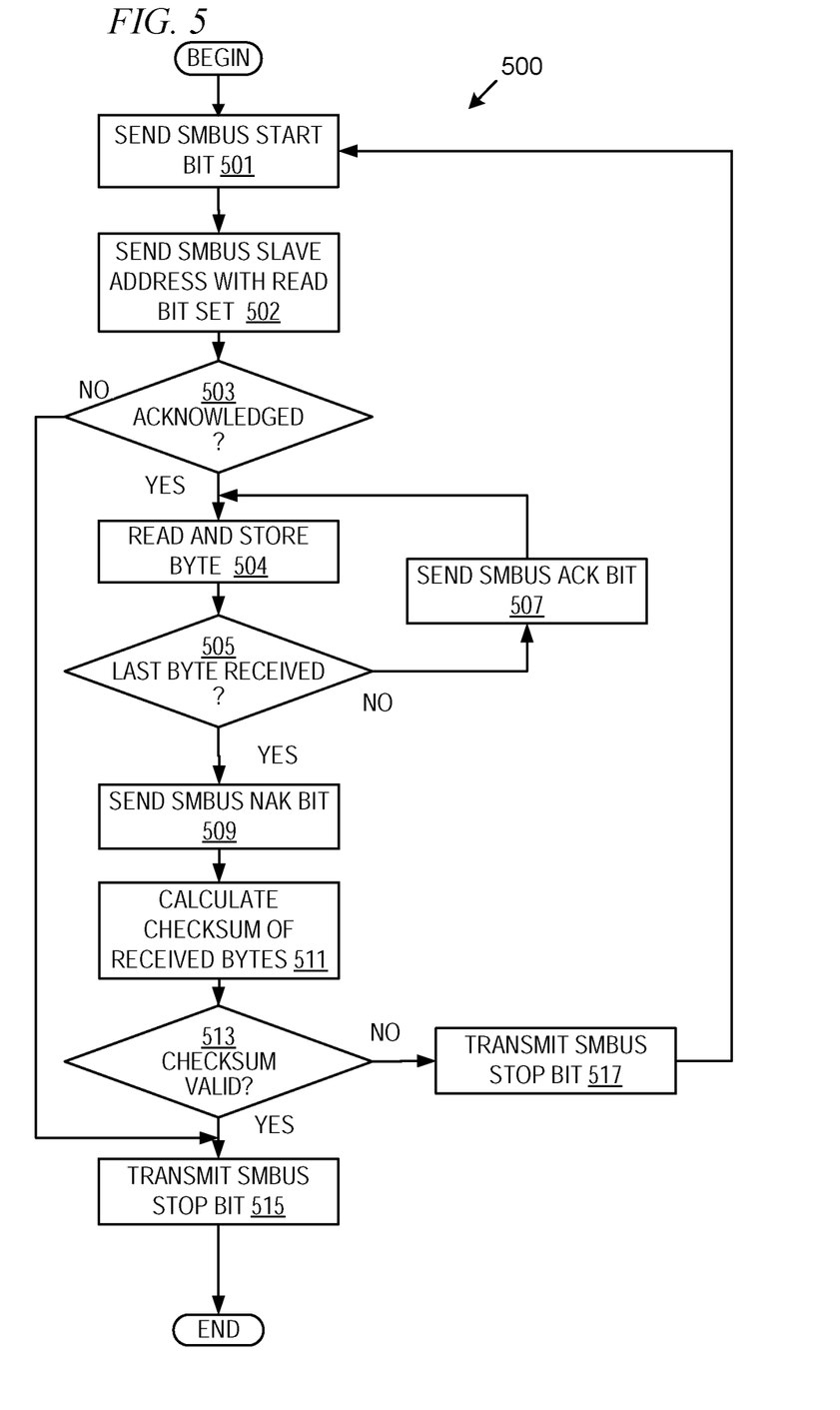
FIG. 5 is a flowchart of operation of a service processor controlling the PCIe hub card in accordance with an illustrative embodiment of the invention.

FIG. 5 is a flowchart of the operation of a service processor controlling the PCIe hub card in accordance with an illustrative embodiment of the invention. The service processor can be, for example, service processor 0 251 of FIG. 2. Flowchart 500 illustrates the possibility of multiple iterations of receiving location bytes through steps 504 through 507.

Initially, the service processor sends via the SMBus a start bit (step 501). Next the service processor sends the slave device address with the read bit set (step 502). Next, the service processor determines whether the SMBus slave address is acknowledged (step 503). If the SMBus read is not acknowledged within a suitable period, the determination is negative, and step 515 is performed, as explained below.

Alternatively, if the service processor receives an acknowledgment, the service processor may read a byte from the shared memory and store the byte (step 504). Further, the service processor may determine whether a last byte is received (step 505). If the last byte is not received, the service processor sends SMBus ack bit (step 507). Further iterations of step 504, for example, reading location bytes, may occur. A location byte is one among N bytes of location information received as byte 409 or byte 429 as shown in FIG. 4.

Next, the service processor may read and store a byte (step 504). The service processor may further determine if the last byte is received (step 505). The last byte is the final byte that completes either the location information or otherwise ends the data that can be read via the SMBus. The service processer may determine whether a last byte is received at step 505. If the result is positive, the service processor may send a SMBus nak bit (step 509). The service processor may perform calculations based on bytes received from the PCIe card. In other words, the service processor calculates a checksum of the received location information bytes (step 511). The received location information bytes may be those bytes received since step 503 minus the number of bytes used for the checksum.

Next, the service processor determines if the checksum is valid (step 513). If the checksum that is calculated matches the checksum that is received, the determination at step 513 is positive. In the positive case, the PCIe hub card may transmit a stop bit to the PCIe card (step 515). However, in the negative case, the PCIe hub card transmits a stop bit (step 517). Step 517 is followed by another attempt at sending location information. Accordingly, the next step can be step 501. In the example described, above, the data transfer is started by the PCIe hub card sending a start bit followed by the I2C slave address with read bit set. The PCIe card acknowledges the slave device address in case of a match.

The illustrative embodiments permit a physical installation of I/O units and PCIe cards to be installed such that the system controller may both determine their physical location and report the details of their location to administrative staff. Moreover, such configuration and reporting details may be performed without resorting to fully powering all circuits of the I/O units and PCIe cards. To the extent that each I/O unit is under the control of a service processor, the class of these service processors may be called first service processors. These first service processors obtain location information first. Although some embodiments may use a single first service processor, multiple such first service processors may be a more common or better arrangement. These first service processors may rely on a second service processor, namely the service processor in the processor unit. Accordingly, illustrative embodiments of the invention permit the second service processor to aggregate location data, and pass that information along to a system controller. The transmitting of aggregate location data can be in response to the system controller polling the second service processor, or based on the second service processor asynchronously dispatching the location information to the system controller. Further, the configuration and location detecting steps can use an out-of-band portion of PCIe cables and/or busses for the configuration activity, and make dual use of such cables and busses by using them to handle functional path signaling.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable-medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any tangible apparatus that can contain, store, the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, remote printers or computer readable tangible storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for retrieving location information in a data processing system, the computer implemented method comprising:

booting a first at least one service processor controlling at least one Peripheral Component Interconnect Express (PCIe) card in an I/O unit;

booting a second at least one service processor located in a processor unit, wherein the processor unit and the I/O unit are interconnected using functional path conductors, wherein functional path conductors are according to Peripheral Component Interconnect Express (PCIe) standard;

reading location information from the first at least one service processor, wherein the location information is reported for each PCIe card in the I/O unit prior to initializing a functional path to the PCIe card, wherein reading is at the second at least one service processor;

responsive to reading location information, sending location information from the second at least one service processor to a system controller;

responsive to collecting location information, initializing the PCIe card and a hub card of the processor unit in order to initialize a functional path; and configuring the I/O unit by communicating configuration commands over the functional path connected to the PCIe card.

2. The computer implemented method of claim 1, wherein the first at least one service processor determines location information for each PCIe card located in the I/O unit and writes the location information to shared memory.

3. The computer implemented method of claim 1, wherein sending location information delivers location information to the system controller.

4. The computer implemented method of claim 1, wherein the second at least one service processor supports at least one additional processor unit as well as the processor unit.

5. The computer implemented method of claim 1, wherein reading location information from the first at least one service processor comprises the second at least one service processor reading location information from all PCIe cards connected to the functional path conductors.

6. The computer implemented method of claim 1, wherein collecting location information comprises:
receiving location information via a two-wire interface to the second at least one service processor; and
transmitting location information from the second at least one service processor to a system controller.

7. The computer implemented method of claim 1, further comprising:
responsive to booting, transmitting a send request to the second at least one service processor over a service network.

8. The computer implemented method of claim 1, wherein booting further comprises:
each first at least one service processor determining location information of the I/O unit; and
each first at least one service processor storing the location in a system management bus (SMBus) shared memory, wherein the SMBus shared memory is controlled by the first at least one service processor.

9. The computer implemented method of claim 8, wherein initializing the functional path further comprises:
physically connecting SMBus conductors to a PCIe chip.

10. A computer program product for retrieving location information in a data processing system, the computer program product comprising:
a computer readable storage medium having computer readable program code embodied therewith, the computer readable program code comprising:
computer readable program code configured to boot a first at least one service processor, wherein the first at least one service processor controls at least one Peripheral Component Interconnect Express (PCIe) card in an I/O unit;
computer readable program code configured to boot a second at least one service processor located in a processor unit, wherein the processor unit and the I/O unit are interconnected using functional path conductors, wherein functional path conductors are according to Peripheral Component Interconnect Express (PCIe) standard;
computer readable program code configured to read location information from the first at least one service processor, wherein the location information is reported for each PCIe card in the I/O unit prior to initializing a functional path to the PCIe card, wherein reading is at the second at least one service processor;
computer readable program code configured to send location information from the second at least one service processor to a system controller, in response to reading location information;
computer readable program code configured to initialize the PCIe card and a hub card of the processor unit in order to initialize the functional path, responsive to collecting location information; and
computer readable program code configured to configure the I/O unit by communicating configuration commands over the functional path connected to the PCIe card.

11. The computer program product of claim 10, wherein computer readable program code in the first at least one service processor is configured to determine location information for each PCIe card located in the I/O unit and writes the location information to shared memory.

12. The computer program product of claim 10, wherein computer readable program code configured to send location information is computer readable program code configured to deliver location information to the system controller.

13. The computer program product of claim 10, wherein the second at least one service processor is relied on by the first at least one service processor, wherein the first at least one service processor comprises a first I/O unit service processor and a second I/O unit service processor, and the first I/O unit service processor and the second I/O unit service processor are connected in series by the functional path conductors.

14. The computer program product of claim 10, wherein computer readable program code configured to read location information from the first at least one service processor comprises computer readable program code on the second at least one service processor configured to read location information from all PCIe cards connected to the Peripheral Component Interconnect Express (PCIe) connection.

15. The computer program product of claim 10, wherein computer readable program code configured to collect location information comprises:
computer readable program code configured to receive location information via a two-wire interface to the second service processor; and
computer readable program code configured to transmit location information from the second service processor to the system controller.

16. The computer program product of claim 10, further comprising:
computer readable program code configured to receive location information via a two-wire interface using conductors of the Peripheral Component Interconnect express (PCIe) connection, responsive to computer readable program code configured to boot the second at least one service processor.

17. The computer program product of claim 10, wherein computer readable program code configured to boot further comprises:
computer readable program code configured, on each first at least one service processor, to determine location information of the I/O unit; and
computer readable program code configured, on each first at least one service processor, to store the location in a system management bus (SMBus) shared memory, wherein the SMBus shared memory is controlled by the first at least one service processor.

18. A data processing system comprising:
a Peripheral Component Interconnect Express (PCIe) connection comprising a two-wire interface and a functional path;
a first at least one PCIe chip in a PCIe card, operatively coupled to a first end of the functional path, and conditionally coupled to a first end of the two-wire interface based on operation of a first switch;
a second at least one PCIe chip in a hub card, operatively coupled to a second end of the functional path, and conditionally coupled to the second end of the two-wire interface based on operation of a second switch; and
a memory, operatively coupled to a first end of the two-wire interface, and an SMBus master operatively coupled to a second end of the two-wire interface, wherein the SMBus master is configured to read location information from the memory.

19. The data processing system of claim 18, wherein the first switch and second switch are operated after the functional path is initialized and operation of the first switch and the second switch are configured to responsively connect the two-wire interface to the first at least one PCIe chip, and are configured to connect the two-wire interface to the second at least one PCIe chip.

20. The data processing system of claim 18, wherein the memory is a serial electrically erasable programmable read-only memory.

* * * * *